US011740993B2

(12) United States Patent
Beaumont-Smith et al.

(10) Patent No.: US 11,740,993 B2
(45) Date of Patent: Aug. 29, 2023

(54) DEBUG TRACE OF CACHE MEMORY REQUESTS

(71) Applicant: Apple Inc., Cupertino, CA (US)

(72) Inventors: Andrew J. Beaumont-Smith, Cambridge, MA (US); Sandeep Gupta, San Mateo, CA (US); Krishna C. Potnuru, San Jose, CA (US); Matthias Knoth, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/538,939

(22) Filed: Nov. 30, 2021

(65) Prior Publication Data

US 2023/0061419 A1    Mar. 2, 2023

Related U.S. Application Data

(60) Provisional application No. 63/239,349, filed on Aug. 31, 2021.

(51) Int. Cl.
| | |
|---|---|
| *G06F 12/00* | (2006.01) |
| *G06F 11/34* | (2006.01) |
| *G06F 11/30* | (2006.01) |
| *G06F 12/02* | (2006.01) |

(52) U.S. Cl.
CPC ........ *G06F 11/348* (2013.01); *G06F 11/3037* (2013.01); *G06F 12/0223* (2013.01); *G06F 2212/1008* (2013.01)

(58) Field of Classification Search
CPC ..... G06F 3/0625; G06F 3/0653; G06F 3/0679
See application file for complete search history.

(56) References Cited

U.S. PATENT DOCUMENTS

| | | | | | |
|---|---|---|---|---|---|
| 6,094,729 | A | * | 7/2000 | Mann | G06F 11/3636 714/33 |
| 6,142,683 | A | * | 11/2000 | Madduri | G06F 11/3664 714/E11.212 |
| 6,154,856 | A | * | 11/2000 | Madduri | G06F 11/3656 714/E11.21 |
| 6,189,140 | B1 | * | 2/2001 | Madduri | G06F 11/3632 714/E11.212 |
| 6,658,578 | B1 | * | 12/2003 | Laurenti | G06F 9/384 712/E9.032 |
| 2004/0041275 | A1 | * | 3/2004 | Higashida | G06F 11/348 257/777 |

(Continued)

*Primary Examiner* — Shawn X Gu
*Assistant Examiner* — Mohammad S Hasan
(74) *Attorney, Agent, or Firm* — Kowert, Hood, Munyon, Rankin & Goetzel, P.C.; Scott W. Pape; Dean M. Munyon

(57) ABSTRACT

An apparatus includes a plurality of processor circuits, a cache memory circuit, and a trace control circuit. The trace control circuit may be configured, in response to activation of a mode to record information indicative of program execution of at least one processor circuit of the plurality of processor circuits, to monitor memory requests transmitted between ones of the plurality of processor circuits and the cache memory circuit, and then to select a particular memory request of monitored memory requests using an arbitration algorithm. The trace control circuit may be further configured to allocate space in a trace buffer to the particular memory request, and to store, in the trace buffer, information associated with the particular memory request.

20 Claims, 8 Drawing Sheets

(56) References Cited

U.S. PATENT DOCUMENTS

| | | | |
|---|---|---|---|
| 2004/0049665 A1* | 3/2004 | Kanzaki | G06F 11/348 714/E11.215 |
| 2008/0082720 A1 | 4/2008 | Moyer | |
| 2010/0268893 A1 | 10/2010 | Luttrell | |
| 2011/0320716 A1 | 12/2011 | Collura et al. | |
| 2012/0072686 A1* | 3/2012 | Iyengar | G06F 3/0632 711/170 |
| 2015/0269054 A1* | 9/2015 | Kothamasu | G06F 11/348 714/45 |
| 2016/0232073 A1* | 8/2016 | Cook | G06F 11/3065 |
| 2021/0200632 A1* | 7/2021 | Pawlowski | G06F 11/1068 |

* cited by examiner

| Information 457 | | | | | | | |
|---|---|---|---|---|---|---|---|
| tag word 460 | | | | data word 465 | | | |
| cnt 440a | metadata 440b | tag type 440c | req 440d | metadata 440e | address 440f | timestamp 440g | } fill request entry 450 |
| cnt 440a | fill data 440h | seq 440i | tag type 440c | req 440j | fill data 440k | metadata 440l | timestamp 440m | } fill data entry 455a |
| fill data 440n | seq 440o | tag type 440c | req 440j | fill data 440p | | | } fill data entry 455b |

*FIG. 4*

DEBUG TRACE OF CACHE MEMORY REQUESTS

PRIORITY CLAIM

This application claims the benefit of U.S. Provisional Patent Application No. 63/239,349, filed on Aug. 31, 2021, and whose disclosure is incorporated herein by reference.

BACKGROUND

Technical Field

Embodiments described herein are related to systems-on-a-chip (SoCs) and, more particularly, to methods for tracing program execution flow.

Description of the Related Art

A software program executing on a computer system may include various branching instructions. Input received by the computer system may impact when particular branch instructions take a branch or continue executing without branching. In order to observe a flow of program execution, hardware and software developers may utilize a debug trace mode available in the computer system. Such debug trace modes may enable developers to investigate unexpected behavior of hardware and/or software of the computer system, evaluate hardware changes to the computer system, evaluate new and/or revised software programs, and the like.

When a trace mode is enabled in a computer system, particular debug circuits may observe activity on one or more processor buses coupled to corresponding processor cores. Values observed on the processor buses may be sent to a debugger that includes respective debug hardware and/or software that executes on the computer system or in a separate debugger system coupled to the computer system. The debugger may then use the received data to determine which instructions and associated data are being executed at a given time, and provide this information to the developer.

SUMMARY

In an embodiment, an apparatus includes a plurality of processor circuits, a cache memory circuit, and a trace control circuit. The trace control circuit may be configured, in response to activation of a mode to record information indicative of program execution of at least one processor circuit of the plurality of processor circuits, to monitor memory requests transmitted between ones of the plurality of processor circuits and the cache memory circuit, and then to select a particular memory request of monitored memory requests using an arbitration algorithm. The trace control circuit may be further configured to allocate space in a trace buffer to the particular memory request, and to store, in the trace buffer, information associated with the particular memory request.

In a further example, the particular memory request may be a read request that results in a cache miss. In another example, to store the associated information in the trace buffer, the trace control circuit may be configured to copy cache fill data enroute to the cache memory circuit.

In an example, the trace control circuit may be further configured to store the particular memory request in an entry in a request buffer, and to delete the entry in response to a determination that the information associated with the particular memory request has been stored in the trace buffer. In an embodiment, the trace control circuit may be further configured to, in response to a determination that the trace buffer has reached a threshold level of capacity, issue a stall request to one or more of the processor circuits.

In another embodiment, the apparatus may further include a fill buffer, and the trace control circuit may be further configured to store the associated information in the fill buffer in response to a determination that the trace buffer does not have sufficient space for the associated information. In a further example, the trace control circuit may be further configured to include a timestamp with the associated information.

BRIEF DESCRIPTION OF THE DRAWINGS

The following detailed description makes reference to the accompanying drawings, which are now briefly described.

FIG. 4 illustrates an embodiment of information stored in a trace buffer.

Figure 1:
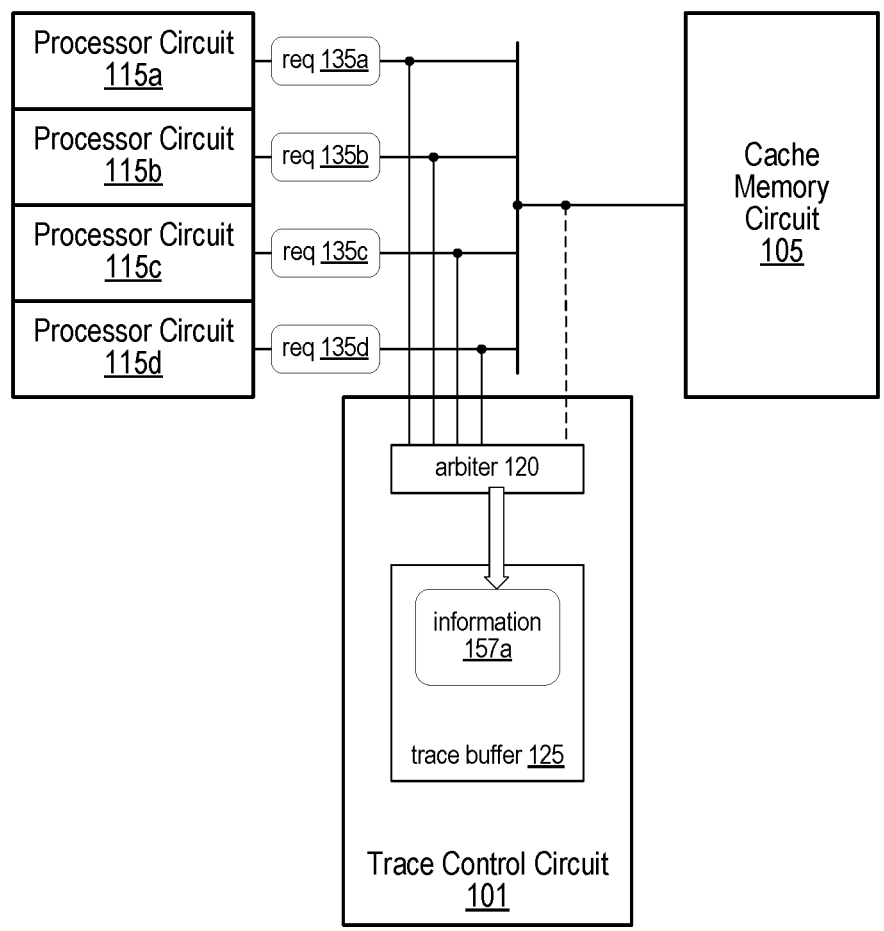
FIG. 1 illustrates a block diagram of an embodiment of a system that includes a trace control circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

Various inputs to a processor core may impact a flow of each instance of a given software program. User input may be received via keyboards, mice, touchscreens, etc. Audio data from a microphone and image data from a camera may also provide input to the processor core. In some cases, such input may be received via a cache memory, in response to a memory request from the processor core. Cache memories may have a cache controller circuit that receives memory requests form the processor core, determines if the requested memory locations are currently cached in the cache memory circuit, and then issues a fill request in response to a cache miss. Such fill requests may take multiple system clock cycles to be fulfilled, resulting in many clock cycles elapsing between an initial memory request being issued by the processor core and the cache memory returning the requested data after a fill request has been fulfilled. Such a delay between issuing and completing memory requests may increase a difficulty for a debugger to reconstruct an accurate representation of the program flow. Other activity occurring on a bus of the processor core may obfuscate a link between the initial memory request and the requested data being returned. A debugger may require an undesirable amount of time to process all trace data received from the processor core bus to reconstruct the accurate program flow. Without adequate processing time, the debugger may produce an inaccurate program flow.

The present disclosure considers a novel digital circuit that traces data read into a cache memory. This data tracing may be used to aid in the modeling a variety of microarchitectural features, such as predicting load values, tracking data toggle rates, estimating processor and co-processor power consumption, evaluating effectiveness of power control features, and determining cache data compression algorithms. By capturing cache memory fill data, a data state may be reconstructed for an entirety of a program by running the program in a simulator using the captured data as input.

The disclosed embodiments describe systems and methods for tracing memory requests sent to a cache memory circuit. The disclosed methods may decrease an amount of time for reconstructing a program flow from a stream of trace data. For example, an embodiment may include a trace control circuit that monitors transactions between a plurality of processor circuits and a cache memory circuit. Memory requests from the processor circuits to the cache memory circuit are buffered and arbitration may be used to select one of the buffered memory requests for tracing. Trace buffer space is allocated for the selected memory request, and then information regarding the performance of the selected request is placed into allocated space in the trace buffer.

FIG. 1 illustrates a block diagram of one embodiment of a system that traces memory requests transmitted between a plurality of processor circuits and a cache memory circuit. As illustrated, system 100 includes trace control circuit 101, cache memory circuit 105 and processor circuits 115a-115d (collectively processor circuits 115). Trace control circuit 101 includes arbiter 120 and trace buffer 125.

As illustrated, processor circuits 115 correspond to any suitable type of processing circuit. For example, processor circuits may be multiple instances of a same processor core design in a multicore processor. In other embodiments, processor circuits 115 may be part of a heterogenous processing complex in which at least one of processor circuits 115 differs from the others. In some embodiments, processor circuits 115 may correspond to a general-purpose processor core and a plurality of co-processor circuits, such as a floating-point processor, graphics processor, encryption engine, and the like. In the illustrated embodiment, each of processor circuits 115 is capable of issuing a respective memory request (req) 135a-135d (collectively memory request 135) to cache memory circuit 105.

Cache memory circuit 105, as shown, includes memory and logic circuits for caching memory locations requested by processor circuits 115. Cache memory circuit 105 may be organized using any suitable cache structure, including use of multiple ways and/or sets. Cache memory circuit 105 includes circuits for performing caching operations, such as maintaining cache tags, determining if an address related to a memory transaction is a hit (a cache line currently corresponds to the address) or miss (no cache line has been filled with data corresponding to the address), issuing cache-line fill requests in response to a miss, marking cache lines for eviction, and the like. In some embodiments, one or more of processor circuits 115 may include a respective first-level cache memory circuit (e.g., an L1 cache) to cache instructions and/or operand data for the respective processor circuit 115. In such embodiments, an L1 cache may share a bus interface with other processing circuits in the respective processor circuit 115. Cache memory circuit 105 may correspond to an L2 or L3 cache that supports a plurality of processor circuits, such as the illustrated processor circuits 115.

As shown, trace control circuit 101 is configured to monitor bus interfaces of each of processor circuits 115. Trace control circuit 101 is further configured, in response to activation of a debug trace mode, to record trace information (e.g., information 157a) that is indicative of program execution of at least one of processor circuits 115. Trace control circuit 101 may buffer the trace information to be read by a debugger system that may be included in system 100, or may be a separate system coupled to system 100. In some embodiments, the debug trace mode may be enabled for each of processor circuits 115 individually. In other embodiments, debug trace mode may be individually selectable for respective subsets of processor circuits 115.

While the debug trace mode is enabled for particular ones of processor circuits 115 (e.g., processor circuits 115a-115b), trace control circuit 101 is configured to monitor memory requests 135a and 135b transmitted between processor circuits 115 and cache memory circuit 105. Trace control circuit 101 may monitor the respective buses of processor circuits 115a and 115b and detect indications of memory requests 135a and 135b, such as instructions and/or addresses that are associated with cache memory circuit 105. For example, each of memory requests 135 may include a particular transaction address that corresponds to cache memory circuit 105, and detection of this transaction address is indicative of a memory request 135 sent to cache memory circuit 105. In other embodiments, trace control circuit 101 may be configured to monitor a bus interface of cache memory circuit 105 (as indicated by the dashed line in FIG. 1) and detect all memory requests 135 sent to cache memory circuit 105. In such embodiments, memory requests 135a and 135b that are associated with processor circuits 115a and 115b, respectively, may be identified by information included in the memory requests 135, such as a requestor identification value.

Trace control circuit 101 may further be configured to select a particular memory request of monitored memory requests 135a and 135b using arbiter 120. Arbiter 120 may, in various embodiments, be implemented using hardware circuits, software, firmware, or a suitable combination thereof. Arbiter 120 uses an arbitration algorithm to select from among the detected memory requests 135a and 135b. Any suitable arbitration algorithm may be employed, and may take into consideration any of, e.g., a least recently selected processor circuit, priority levels associated with each memory request, types of memory requests detected, and the like. For example, arbiter 120 may select memory request 135a in response to determining that memory request 135a is a read request that results in a cache miss. In other cases, arbiter 120 may select memory request 135a in response to determining that memory request 135a is a write request that hits in cache memory circuit 105.

As illustrated, trace control circuit 101 is also configured to allocate space in trace buffer 125 to the selected memory request 135a. If memory request 135a is a read request that misses in cache memory circuit 105, then cache memory circuit 105 may be expected to issue a fill request to fetch information corresponding to memory request 135a from, for example, a system memory. As disclosed above, a cache miss may result in multiple clock cycles of delay, thereby increasing an amount of time from when processor circuit 115a issues memory request 135a to when cache memory circuit 105 responds with the requested information.

To reduce an amount of time between the issuing of memory request 135a and capturing requested information, trace control circuit 101 is further configured to store, in trace buffer 125, information 157a associated with memory request 135a. Trace control circuit 101 may observe information 157a as it is being sent to cache memory circuit 105, rather than wait for cache memory circuit 105 to relay information 157a to processor circuit 115a. Cache memory circuit 105 may further cache a local copy of information 157a so that a subsequent memory request to cached locations results in a cache hit rather than a cache miss.

By monitoring issued memory requests sent from a monitored processor circuit to a cache memory circuit, a trace controller circuit may identify and select a memory request that may result in a delayed response. The trace control circuit may then be capable of observing the delayed response before the processor circuit receives it, allowing the response to be recorded and more easily associated with the selected memory request. In some embodiments, additional information may be recorded to indicate that the memory request was, for example, a cache miss and that the response is a result of a cache fill request. Such information may be useful to a developer or other user of a debugger system receiving the recorded trace information.

It is noted that system 100, as illustrated in FIG. 1, is merely an example. The illustration of FIG. 1 has been simplified to highlight features relevant to this disclosure. Various embodiments may include different configurations of the circuit elements. For example, the number processor circuits may differ in various embodiments. In some embodiments, additional trace buffers may be included, for example, with each trace buffer associated with a different subset of processor circuits 115.

The system illustrated in FIG. 1 is shown in a simplified depiction for clarity. Trace control circuits may be implemented in various fashions. An example of a trace operation of a memory request that results in a cache miss is shown in FIG. 2.

Figure 2:
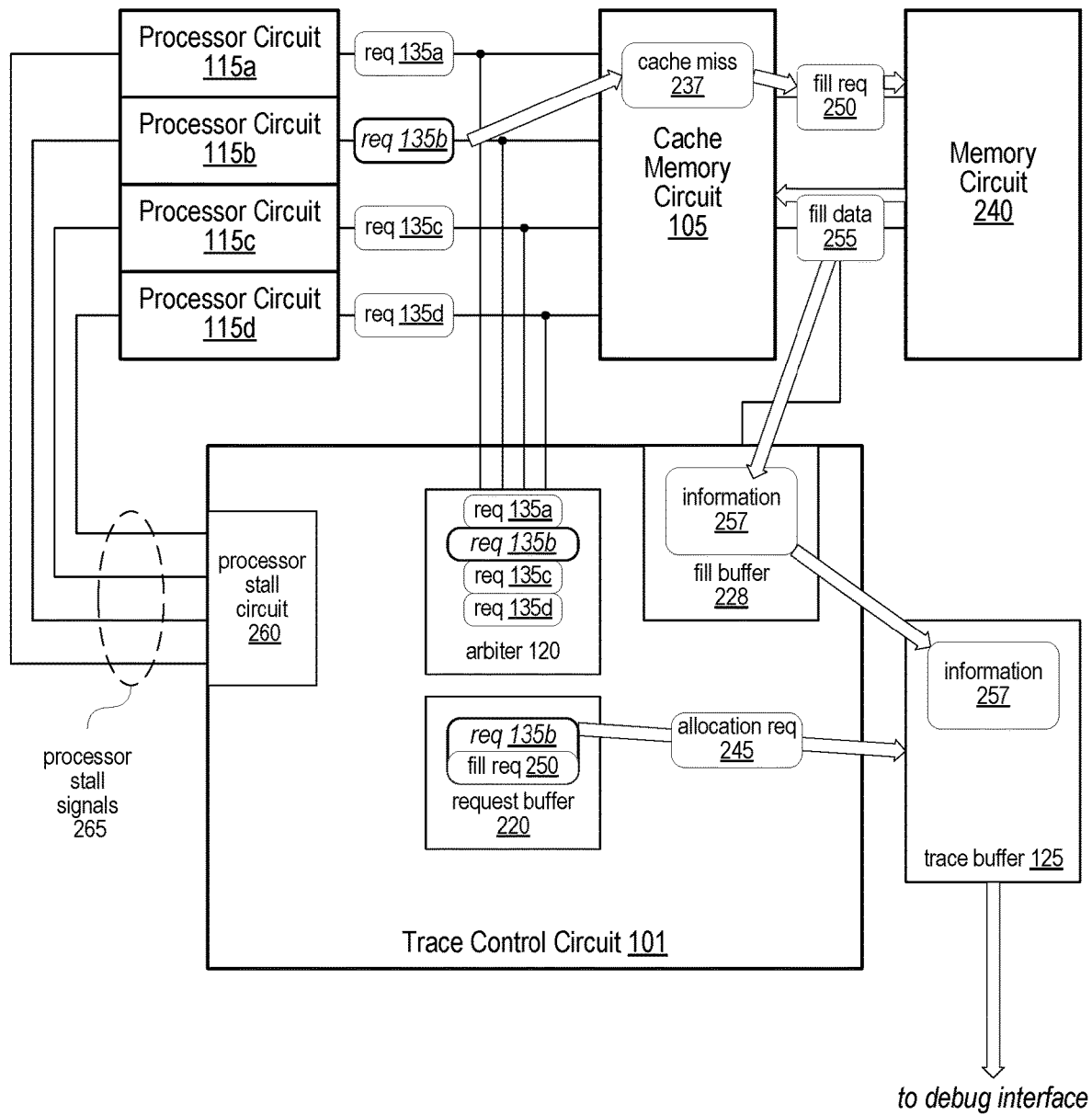
FIG. 2 shows a block diagram of another embodiment of a system that includes a trace control circuit that monitors memory requests between a plurality of processor circuits and a cache memory circuit.

Moving to FIG. 2, a block diagram of a more detailed embodiment of a system with a trace control circuit is shown. System 200, as shown, includes trace control circuit 101, cache memory circuit 105, processor circuits 115 and trace buffer 125 from system 100 in FIG. 1. Operation of these elements is the same as presented above except as described below. In addition, system 200 includes memory circuit 240, coupled to cache memory circuit 105. Trace control circuit 101 includes arbiter 120, as previously shown in FIG. 1. Furthermore, trace control circuit 101 includes request buffer 220, fill buffer 228, and processor stall circuit 260.

As previously described, trace control circuit 101 is configured to monitor memory requests 135 between processor circuits 115 and cache memory circuit 105, select particular ones of memory requests 135 and store information (e.g., information 257) related to a selected memory request 135 to trace buffer 125. Arbiter 120 is configured to evaluate the monitored memory requests 135, looking for, among other characteristics, a cache fill request sent in response to a cache miss. As illustrated, memory request 135b is a read request that results in cache miss 237 in cache memory circuit 105. Accordingly, arbiter 120, as depicted, selects memory request 135b and trace control circuit 101 is further configured to store memory request 135b in a respective entry in request buffer 220.

In response to cache miss 237, cache memory circuit 105 issues fill request 250 to memory circuit 240 which may include memory locations corresponding to an address in memory request 135b. In response to the issuing of fill request 250, memory circuit 240 is configured to retrieve the requested data from memory cells in memory circuit 240, and respond to fill request 250 using the retrieved data as fill data 255. In some embodiments, memory circuit 240 may use a plurality of bus clock cycles to receive and fulfill fill request 250. For example, memory circuit 240 may be a memory device such as a dynamic random-access memory (DRAM) module, or a solid-state drive (SSD) that is located on a different integrated circuit and/or different circuit board than system 100. Various types of bus protocols used to access such memory devices may allow for multiple other memory requests to be exchanged between processor circuits 115 and cache memory circuit 105, resulting in a delay time between fill request 250 being issued and fill data 255 being returned.

During this delay time, trace control circuit 101 may be configured to associate the entry in request buffer 220 for memory request 135b with fill request 250. In addition, trace control circuit 101 is configured to issue allocation request 245 in trace buffer 125. Allocation request 245 may reserve space in trace buffer 125 to store information 257 (associated with fill data 255) once fill data 255 is available. In order to store information 257, associated with memory request 135b, in trace buffer 125, trace control circuit 101 is configured to copy fill data 255 enroute to cache memory circuit 105. Fill data 255 may copied in transit to cache memory circuit 105 rather than read from cache memory circuit 105 after arrival. By copying fill data 255 enroute, trace control circuit 101 may receive fill data 255 faster than waiting for cache memory circuit 105 to receive fill data 255, store fill data 255 in appropriate cache lines, and update associated cache tags. In addition, copy fill data 255 enroute may avoid a need to issue a separate memory request from trace control circuit 101 to cache memory circuit 105 to retrieve fill data 255.

As illustrated, trace control circuit may be configured to generate information 257 using fill data 255. In some embodiments, information 257 may include fill data 255 as well as various pieces of metadata associated with fill data 255, such as one or more timestamps, such as when memory request 135b was initially observed, when fill request 250 was issued, and/or when fill data 255 was received. Other types of metadata that may be included in information 257 includes, for example, an identifier for processor circuit 115b that issued memory request 135b, an identifier of a program or process being performed by processor circuit 115b, and the like. In response to a determination that information 257 has been stored in trace buffer 125, trace control circuit 101 may be further configured to delete the entry for memory request 135b in request buffer 220.

In some cases, trace buffer 125 may become too full to store information 257 and/or information associated with subsequent memory requests. Trace buffer 125 may be read by a debugger system (either included in, or coupled to, system 200). After particular information is read from trace buffer 125, the corresponding buffer locations may be freed for storing subsequent trace information. If trace buffer 125 is not read by the debugger system at a rate that is equal to, or faster than trace control circuit 101 is storing data in trace buffer 125, then trace buffer 125 may reach a capacity that prevents further information from being stored. For such cases, trace control circuit 101 includes fill buffer 228. Trace control circuit 101 may be configured to store information 257 (including some or all of fill data 255) in fill buffer 228 in response to a determination that trace buffer 125 does not have sufficient space for information 257. For example, trace buffer 125 may not capable of fulfilling allocation request 245 at the time the request is received. Trace buffer 125 may queue allocation request 245 such that an appropriate amount of space is reserved once such space is available, with an expectation that the debugger system will read buffered trace information and free space in trace buffer 125 accordingly. If the debugger system has not freed space in trace buffer 125 by the time fill data 255 is enroute to cache memory circuit 105, then fill data 255 may be buffered in fill buffer 228.

In some embodiments, trace control circuit 101 may be further configured to, in response to a determination that trace buffer 125 has reached a threshold level of capacity, issue a stall request to one or more of processor circuits 115. As shown, trace control circuit 101 includes processor stall circuit 260. Processor stall circuit 260 is configured to assert, based on input from trace control circuit 101, one or more of processor stall signals 265. As shown, processor stall circuit 260 includes a respective processor stall signal 265 for each of processor circuits 115. In other embodiments, two or more of processor circuits 115 may receive a same processor stall signal 265.

When a particular processor stall signal 265 is asserted, the corresponding processor circuit 115 is configured to cease further processing of instructions. In some embodiments, the corresponding processor circuit 115 may complete processing of instructions that were being processed at a time at which the particular processor stall signal is asserted. If trace buffer 125 and/or fill buffer 228 reaches a threshold level of capacity, then trace control circuit 101 may cause processor stall circuit 260 to assert only processor stall signals 265 that correspond to processor circuits 115 that are being traced. For example, if processor circuits 115a and 115b are being traced, then operation of processor circuits 115c and 115d may not cause any further trace information to be generated that is to be stored in trace buffer 125. Continued operation of processor circuits 115a and 115b, on the other hand, may result in further memory requests being issued to cache memory circuit 105, and subsequently, more information 257 to be stored in trace buffer 125 and/or fill buffer 228. By stalling processor circuits 115a and 115b, trace buffer 125 may be allotted time to be read by the debugger system, thereby freeing space for further information 257 to be stored. After the capacity of trace buffer 125, and/or the capacity of fill buffer 228, has fallen below the threshold level, then trace control circuit 101 may be further configured to cause processor stall circuit 260 to de-assert the asserted processor stall signals 265 and processor circuits 115a and 115b may resume operation on subsequent instructions.

It is noted that, in FIG. 2, trace buffer 125 is depicted external to trace control circuit 101, while in FIG. 1, trace buffer 125 is shown as being included within trace control circuit 101. In various embodiments, memory circuits for implementing trace buffer 125 may be included either within or coupled to trace control circuit 101. For example, trace buffer 125 may be implemented using static random-access memory (SRAM) as an element within trace control circuit 101. In other embodiments, trace buffer 125 may be allocated as a portion of a system DRAM, included on a different integrated circuit than trace control circuit 101, and, in some embodiments, on a different circuit board. Any suitable implementation of a memory circuit accessible by trace control circuit 101 may be utilized in various embodiments.

It is also noted that the embodiment of FIG. 2 is one depiction of a system for tracing memory requests associated with a cache memory. Other embodiments, may include a different combination of circuit elements. For example, a different number of processor circuits may be included in other embodiments. In some embodiments, one or more of processor circuits 115 may share a given processor stall signal.

The systems illustrated in FIGS. 1 and 2 depict monitoring of a bus or busses between processor circuits and a cache memory circuit. In some embodiments, a trace control circuit may monitor memory requests between a cache memory circuit and other circuits. For example, FIG. 3 illustrates an embodiment in which a trace control circuit monitors memory requests transmitted between a cache memory circuit and a memory circuit.

Figure 3:
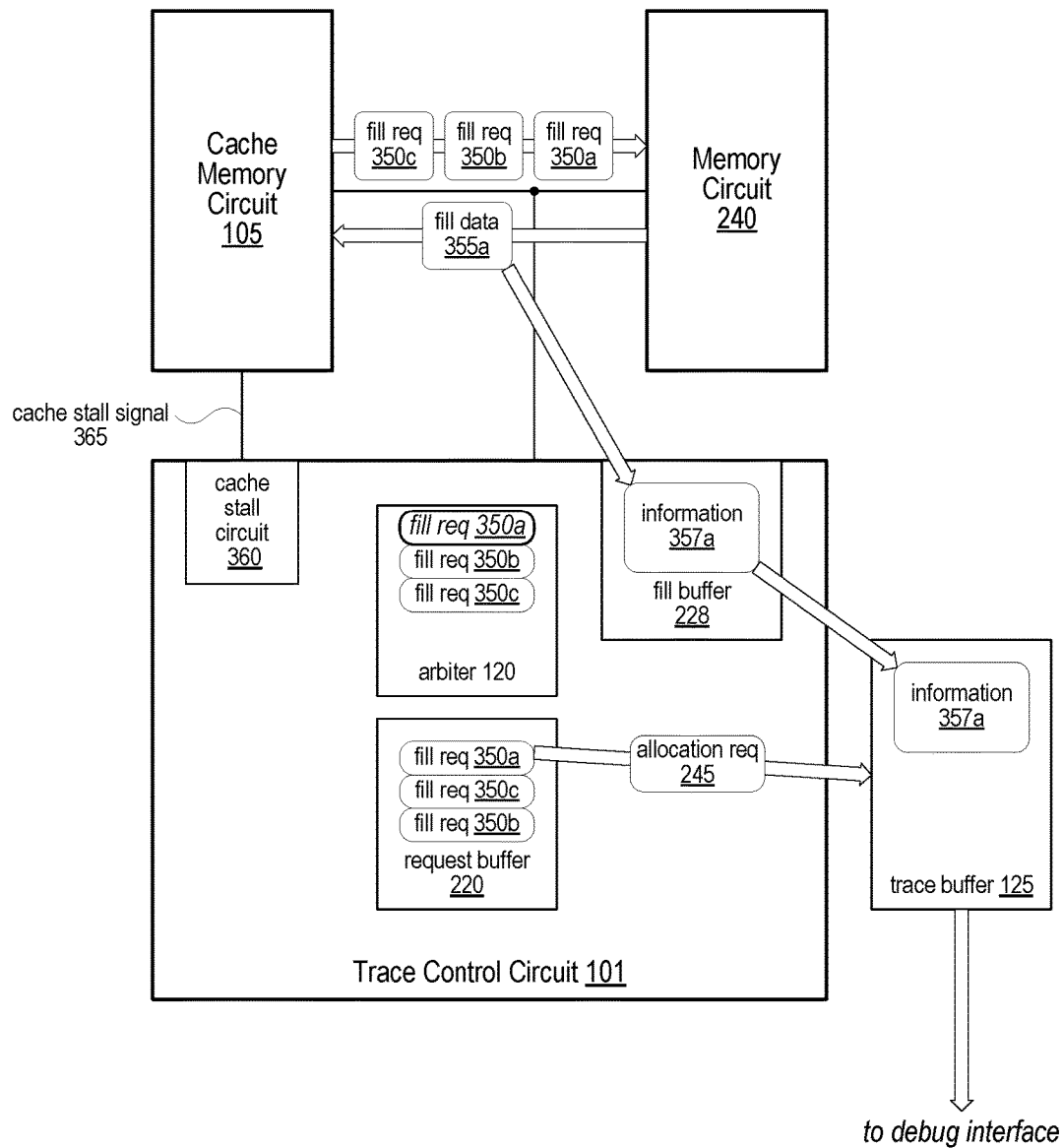
FIG. 3 depicts a block diagram of another embodiment of a system that includes a trace control circuit that monitors memory requests between a cache memory circuit and a memory circuit.

FIG. 3 shows system 300 in which trace control circuit 101 is configured to monitor fill requests issued by cache memory circuit 105 to memory circuit 240. The elements in system 300 may be configured to perform the operations previously described as well as the operations described below. As illustrated, cache memory circuit 105 is configured to issue fill requests 350a-350c (collectively fill requests 350) to memory circuit 240, in response to corresponding cache misses due to memory requests received from processing circuits, such as memory requests 135 from processor circuits 115 in FIGS. 1 and 2.

As illustrated, trace control circuit 101 is configured, in response to activation of a trace mode (e.g., a mode to record information associated with accesses to memory circuit 240) to determine that cache memory circuit 105 issued one or more fill requests 350 to memory circuit 240. As stated, cache memory circuit 105 may issue fill requests 350 to fill cache lines in cache memory circuit 105. In some cases, one or more fill requests 350 may be issued in response to an occurrence of a cache miss. In other cases, some of fill requests 350 may be in response to a cache coherency mechanism that indicates that cached values cache memory circuit 105 are invalid due to the target locations in memory circuit 240 being updated external to cache memory circuit 105.

Trace control circuit 101, as shown, is further configured to select a particular fill request 350 of the one or more fill requests 350 using an arbitration algorithm. Arbiter 120 may implement the arbitration algorithm for selecting fill request 350a over fill requests 350b and 350c. Arbiter 120 may use any suitable algorithm or combination of algorithms to select fill request 350a. For example, arbiter 120 may select fill request 350a based on an order in which fill request 350a was issued, based on a priority level associated with fill request 350a, based on a processor circuit and/or process associated with a memory request that is related to fill request 350a, or any other suitable criteria. In the illustrated embodiment, arbiter 120 is configured to select fill request 350a in response to a determination that fill request 350a is related to a read request that resulted in a cache miss.

After selection of fill request 350a is made, then trace control circuit 101 may be configured to issue allocation request 245 to allocate locations in trace buffer 125 for storage of information 357a related to fill request 350a. Trace control circuit 101 is further configured to detect when fill data 355a is enroute from memory circuit 240 to cache memory circuit 105 as a response to fill request 350a. Trace control circuit 101 may be further configured to copy fill data 355a while it is in transit to cache memory circuit 105. Accordingly, a need to issue a memory request to cache memory circuit 105 to retrieve fill data 355a after it has been stored in cache memory circuit 105 may be avoided.

After fill data 355a has been copied, trace control circuit 101 is configured to store, in the allocated locations in trace buffer 125, information 357a that is associated with processing of the fill request 350a. Information 357a may include some or all of fill data 355a. Information 357a may also, or alternatively, include various forms of metadata associated with fill request 350a, fill data 355a, and/or a memory request received by cache memory circuit 105 that is related to fill request 350a. For example, metadata may include one or more timestamps, information about a processor circuit associated with fill request 350a, a target address in memory circuit 240, and similar types of information related to fill request 350a and fill data 355a.

As depicted, trace control circuit 101 may be further configured to store fill requests 350 in respective entries in request buffer 220. After information 357a is stored in trace buffer 125, trace control circuit 101 may be configured to select another fill request from request buffer 220 using, for example, arbitration results from arbiter 120. In addition, trace control circuit 101 may be further configured to delete a respective entry for fill request 350a in response to determining that information 357a has been stored in trace buffer 125.

In a similar manner as described in regards to FIG. 2, trace control circuit 101 may be further configured to store information 357a in fill buffer 228 in response to a determination that trace buffer 125 does not have sufficient space for holding information 357a. As previously described, allocation request 245 may fail to be fulfilled or may otherwise be in queue for processing while fill data 355a is in transit to cache memory circuit 105. Accordingly, a situation may occur in which trace buffer 125 does not have sufficient storage space by the time information 357a is ready to be stored. In such situations, information 357a may be buffered in fill buffer 228 until such time than trace buffer 125 has adequate storage space available for information 357a.

In some embodiments, trace control circuit 101 is further configured, in response to the determination that trace buffer 125 does not have sufficient space to hold information 357a, to assert cache stall signal 365, wherein cache stall signal 365 causes cache memory circuit 105 to cease issuing further fill requests 350. In a similar manner as processor stall circuit 260, cache stall circuit 360 may assert cache stall signal 365 in response to an indication from trace control circuit 101. After trace control circuit 101 determines that trace buffer 125 and/or fill buffer 228 have sufficient available space for storing information 357a, then trace control circuit 101 may cause cache stall circuit 360 to de-assert cache stall signal 365.

It is noted that the example of FIG. 3 is one embodiment for demonstrating disclosed concepts. As previously stated, some elements of system 300 have been omitted for clarity. Although a single cache memory circuit and a single memory circuit are shown, in other embodiments, multiple instances of either, or both, may be included. For example, cache memory circuit 105 may be capable of issuing fill requests to a plurality of different memory circuits. Similarly, memory circuit 240 may be capable of supporting fill requests from a plurality of different cache circuits.

In the descriptions of FIGS. 1-3, information related to data transferred in response to a memory request is disclosed. As stated, this information may include some or all of the requested data and/or various pieces of metadata. An example of information stored in a trace buffer is described in FIG. 4.

Turning to FIG. 4, a table depicting an embodiment of three examples of information stored in a trace buffer is illustrated. As illustrated, information 457 includes a plurality of entries including fill request entry 450 and fill data entries 455a and 455b. Each entry includes two portions, tag word 460 and data word 465. These portions may correspond to a trace buffer format that supports other types of trace information in addition to trace information related to given fill requests and fill data. In various embodiments, information 457 may correspond to information 157a, 257, or 357a in FIGS. 1-3, respectively.

As previously stated, information (e.g., information 157a) stored into a trace buffer (e.g., trace buffer 125) may include data related to a memory request as well as other metadata related to the memory request. Information 457 illustrates an example of how trace information may be organized in a given trace buffer. Using FIG. 2 as an example, information 457 corresponds to information 257, related to fill request 250 sent by cache memory circuit 105 and subsequent fill data 255 returned by memory circuit 240. Fill request entry 450 depicts a format of an entry related to fill request 250. Similarly, fill data entry 455a corresponds to a format of a first entry related to fill data 255, while fill data entry 455b depicts a format for one or more subsequent entries that may be needed to buffer all information related to fill data 255. Each entry in trace buffer 125 may be limited to a particular number of bits. As shown, fill request entry 450 includes two portions, a tag word 460 and data word 465. In some embodiments, trace buffer 125 may include two different sets of memory circuits for storing trace information entries, one for a tag word used to identify a particular entry and the other for a data word used to hold data related to the entry, each entry in each portion limited to a respective number of bits.

After fill request 250 is issued by cache memory circuit 105, trace control circuit 101 may be configured to create fill request entry 450 in trace buffer 125. The tag word 460 portion of fill request entry 450 includes four pieces of information: count (cnt) 440a, metadata 440b, tag type 440c, and request indicator (req) 440d. The data word 465 portion of fill request entry 450 includes metadata 440e, address 440f and timestamp 440g. Trace control circuit 101 may be further configured to generate fill data entries 455a and 455b in response to fill data 255 being sent by memory circuit 240. The tag word 460 for fill data entry 455a includes five pieces of information, including count 440a, fill data 440h, sequence number (seq) 440i, tag type 440c, and request indicator (req) 440j. The corresponding data word 465 includes fill data 440k, metadata 440l, and timestamp 440m. Subsequent fill data entries 455b may include less metadata than the first fill data entry 455a, since various pieces of metadata in the first entry may apply to the subsequent entries. This may allow for more fill data to be included in subsequent fill data entries 455b. As shown, the tag word 460 for fill data entry 455b includes sequence number (seq) 440o, tag type 440c, and request indicator 440j. The remainder of the tag word 460 may be filled with fill data 440n, while the entirety of the data word 465 of fill data entry 455b may include fill data 440p.

As illustrated, a value in tag type 440c may indicate what type of operation resulted in the trace information 457 being generated. In the present example, tag type 440c includes a value that indicates information 457 is related to a cache fill request and subsequent fill data. The same value of tag type 440c is used in all entries related to fill request 250 and fill data 255. Trace buffer 125 may be used for capturing a variety of debug trace activity and, therefore, may include a variety of other tag types, such as various types of branch instructions, instruction retire data, instruction cycle count data, processor circuit mode information, and the like.

Request indicator 440d, as shown, may indicate whether the entry is related to a fill request or to fill data. Accordingly, request 440d has a first value to indicate fill request entry 450 is related to a request, while request 440j has a second value to indicate that fill data entries 455a and 455b are not requests (e.g., are data responses to a request).

As illustrated, timestamps 440g and 440m include respective values indicative of a time when the respective entry is created (or, in other embodiments, when fill request 250, or fill data 255, is detected by trace control circuit 101). In various embodiments, timestamps 440g and 440m may indicate an elapsed amount of time from a counter being enabled, or may indicate a time of day and/or a day/month/year. In some embodiments, timestamps 440g and 440m may include a different number of bits and, therefore, have different maximum time periods that can be indicated. For example, timestamp 440g may include 32 bits and may reset to zero every three minutes, with each increment corresponding to approximately 42 nanoseconds. Timestamp 440m may include 48 bits and reset at 135 days using a same increment. Count 440a may further include a count of cycles of a clock signal used by trace control circuit 101 between each increment of timestamps 440g and 440m.

Address 440f, as shown, includes an address value that is indicative of a memory location or range of memory locations in memory circuit 240 from which fill data 255 is read. Address 440f, in various embodiments, may be stored as a virtual address relative to an operating system memory map, a physical address mapped to memory circuit 240, or a combination thereof.

As shown, metadata 440b, 440e, 440l includes various other types of information related to fill request 250 and/or fill data 255. For example, additional metadata values may include values indicative of address translation information, a type of request (e.g., an instruction fetch, a load/store operation, a prefetch operation, and the like).

Sequences 440i and 440o include values indicating an order for fill data entries 455a and 455b. Fill data 255 may include more data than can be held in one or two entries in trace buffer 125. Accordingly, multiple fill data entries may be used, including an initial fill data entry 455a and one or more subsequent fill data entries 455b, each including some portion of values included in fill data 255, as represented by fill data 440h, 440k, 440n, and 440p. As many subsequent fill data entries 455b may be included in information 457 as is necessary to record, for example, all of fill data 255. To maintain an order of the various portions of fill data (e.g., 440h, 440k, 440n, and 440p) such that fill data 255 can be accurately reconstructed by a debugger system, each fill data entry 455a and 455b includes a respective sequence number, such as sequence 440i and 440o. Sequence 440i, corresponding to the initial fill data entry 455a, has a value indicating that fill data entry 455a is the initial entry of a set of one or more related fill data entries. Subsequent fill data entries 455b include respective sequence 440o values that indicate the respective entries order within the set of fill data entries.

By capturing the various pieces of information included in entries of information 457, a significant portion, or even all, data related to an execution of a given program may be captured and relayed to a debugger system. With such information, the debugger system may be capable of reconstructing an accurate execution flow of the given program, thereby allowing a developer to evaluate performance of system 200, and/or the given program, including, for example, capabilities to detect hardware and/or software bugs, identify opportunities for hardware and/or software optimizations, and the like.

It is noted that FIG. 4 is merely an example of information that may be recorded in a trace buffer. Three examples of formats for buffer entries associated with a cache fill request and resulting fill data are shown. In other embodiments, additional and/or different entry formats may be used. For example, the two sets of metadata in fill request entry 450 may be grouped as a single sequential set of bits in other embodiments.

The memory request trace circuits and techniques described above in regards to FIGS. 1-4 may be performed using a variety of methods. Two methods associated with operation of trace control circuit are described below in regards to FIGS. 5 and 6.

Figure 5:
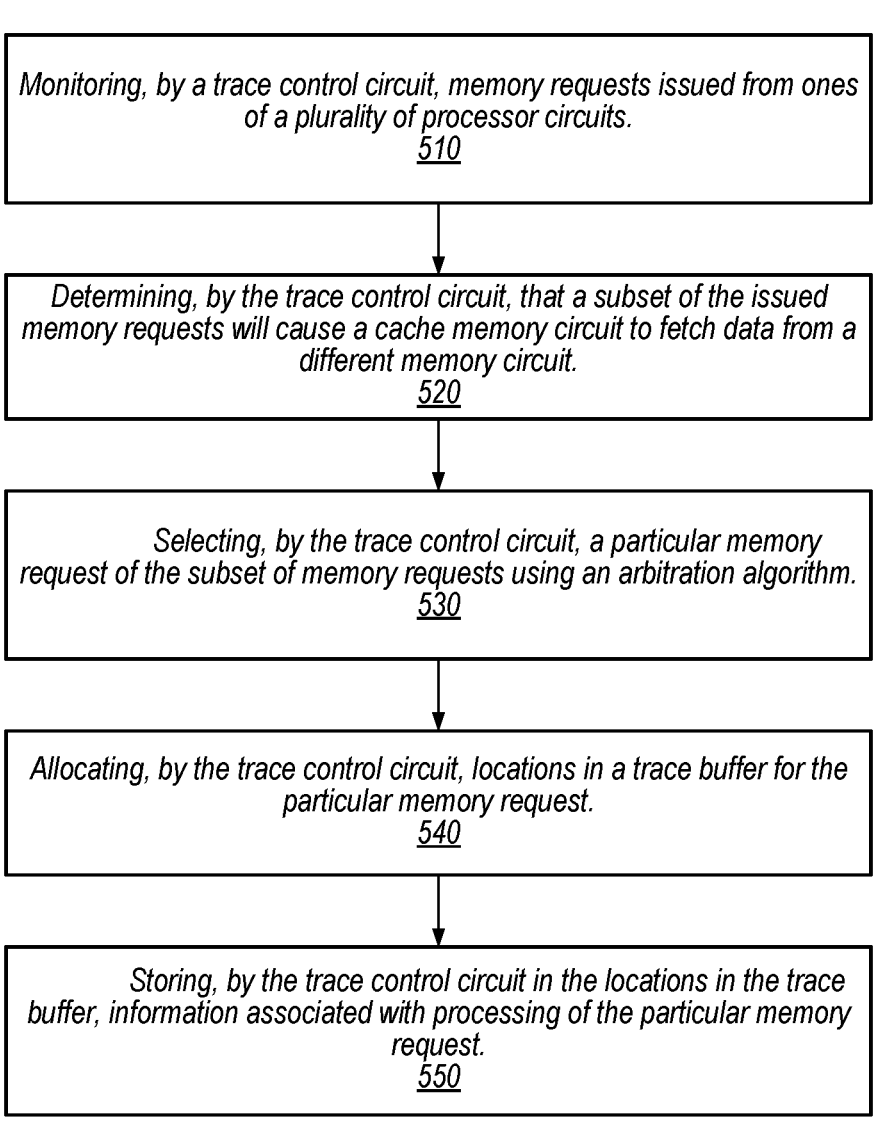
FIG. 5 shows a flow diagram of an embodiment of a method for selecting a monitored memory request and storing trace information related to the memory request.

Proceeding to FIG. 5, a flow diagram for an embodiment of a method for selecting a memory request issued by a processor circuit and tracing information related to the selected memory request by a trace control circuit is shown. Method 500 may be performed by, for example, trace control circuit 101 in FIGS. 1-3. Referring collectively to FIGS. 2 and 5, method 500 begins in block 510.

At block 510, method 500 includes monitoring, by trace control circuit 101, memory requests 135 issued from processor circuits 115. The monitoring may be performed in response to an activation of a mode to record information indicative of program execution of processor circuits 115. For example, a developer may couple a debugger system to system 200, the debugger system activating the mode that enables trace control circuit 101 to perform the monitoring. Information captured while the mode is active may be sent to the debugger system where a flow of execution of one or more programs by system 200 can be reconstructed and analyzed by the developer. Based on inputs from the debugger system, trace control circuit 101 may monitor one, some, or all of processor circuits 115. For example, the debugger system may be used to trace execution of a particular software program that is being executed by processor circuits 115b and 115d. In such cases, only memory request issued by these two processor circuits (e.g., memory requests 135b and 135d, would be monitored). As shown, trace control circuit 101 monitors all four processor circuits 115.

Method 500 further includes, at block 520, determining that a subset of the issued memory requests 135 will cause cache memory circuit 105 to fetch data from memory circuit 240. As illustrated, memory request 135b causes cache miss 237, thereby causing cache memory circuit 105 to issue fill request 250 to memory circuit 240. In other cases, other types of memory requests 135 may cause cache memory circuit 1-5 to issue a fill request to memory circuit 240 or other memory circuit in system 200 (not shown). For example, a particular memory request 135 may include a prefetch request, causing cache memory circuit 105 to request associated data before program execution requests the associated data.

At block 530, method 500 also includes selecting memory request 135b of the subset of the issued memory requests 135 using an arbitration algorithm. As illustrated, trace control circuit 101 uses arbiter 120 to select memory request 135b. Various criteria may be analyzed for each of memory requests 135, including, for example, an age of each memory request 135, a priority or quality of service associated with each memory request 135, a type of request included in each memory request 135, and the like. In the example of FIG. 2, arbiter 120 selects memory request 135b in response to determining that memory request 135b is a read request that results in cache miss 237. Other criteria such as disclosed may be further used to select memory request 135b over the other memory request 135. In some embodiments, an entry may be created and stored in request buffer 220 to identify selected memory request 135b.

Method 500 at block 540 further includes allocating locations in trace buffer 125 for memory request 135b. As depicted, cache miss 237 causes cache memory circuit 105 to issue fill request 250 to memory circuit 240. Fill data 255 is returned by memory circuit 240 at some point in time after fill request 250 is issued. As disclosed above, many cycles of a clock signal in system 200 may elapse between the issue of fill request 250 and the return of fill data 255. Other operations of trace control circuit 101 during this elapsed time may result in other information being stored to trace buffer 125. Accordingly, allocation request 245 may be made to trace buffer 125 to reserve adequate storage space in trace buffer 125 for storing information 257 after fill data 255 is available.

At block 550, method 500 also includes storing, in the locations in trace buffer 125, information 257 associated with processing of memory request 135b. Prior to the storing, fill data 255 that is associated with fill request 250 and, therefore, with memory request 135b, fill data 255 is read as fill data 255 is enroute to cache memory circuit 105. For example, fill data 255 is read before cache memory circuit 105 stores values of fill data 255 into memory cells in cache memory circuit 105. The read values of fill data 255 are used to generate at least a portion of information 257. Other values may be included in information 257, such as a timestamp and/or an indication of a type of request was included in memory request 135b. After information 257 has been stored in trace buffer 125, the entry associated with memory request 135b may be removed from request buffer 220, thereby allotting space for subsequent memory requests to be buffered.

Method 500 may end in block 550 or, in some embodiments, some or all operations of method 500 may be repeated. For example, method 500 may return to block 530 to trace another memory request 135 that has been selected and stored in request buffer 220 by arbiter 120. It is noted that the method of FIG. 5 is merely an example for selecting a memory request and tracing information related to the selected memory request.

Figure 6:
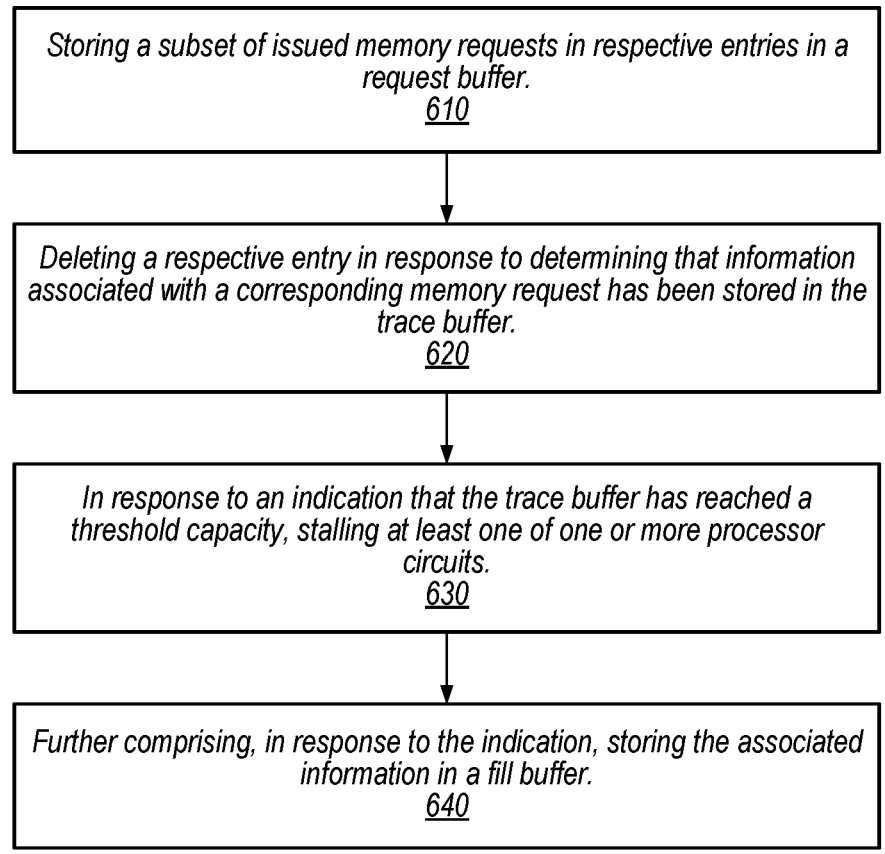
FIG. 6 depicts a flow diagram of an embodiment of a method for operating a trace control circuit.

Moving now to FIG. 6, a flow diagram for an embodiment of a method for operating a trace control buffer is illustrated. In a similar manner as method 500, method 600 may be performed by a trace control circuit, such as trace control circuit 101 in FIGS. 1-3. Operations included in method 600 may be performed in conjunction with particular operations in method 500. Referring collectively to FIGS. 2 and 6, method 600 begins in block 610.

Method 600 at block 610, includes, storing a subset of issued memory requests 135 in respective entries in request buffer 220. As illustrated, entries corresponding to memory requests 135 are created in request buffer 220. Arbiter 120 may be used to arrange and/or prioritize the entries in a particular order for selection and subsequent tracing by trace control circuit 101. Trace control circuit 101 may select a particular memory request 135, e.g., memory request 135b, based on the arrangement/priority of memory requests 135 in request buffer 220.

At block 620, method 600 includes, deleting a respective entry in response to determining that information 257 associated with memory request 135b has been stored in trace buffer 125. After values for fill data 255 are available and are used to generate information 257, information 257 may be stored in trace buffer 125. After information 257 has been stored, then the corresponding entry in request buffer 220 may be removed, and a next prioritized memory request 135 may be selected for tracing.

At block 630, method 600 also includes, in response to an indication that trace buffer 125 has reached a threshold capacity, stalling at least one of processor circuits 115. In some situations, trace buffer 125 may reach a particular level of capacity, such that sufficient storage space for information 257 is not available. In such situations, an indication may be asserted, e.g., by trace buffer 125, when capacity reaches the threshold level. In response to this indication, a corresponding one or more of processor stall signals 265 are asserted, thereby causing processor circuits 115 to cease execution of further instructions. Without further instruction execution, additional memory requests may not be generated and a debugger system may have time to read information from trace buffer 125. After the debugger system reads the stored information from trace buffer 125, the read information may be removed, freeing space in trace buffer 125 to receive more trace information. The asserted processor stall signals 265 may be de-asserted once capacity of trace buffer 125 equals or exceeds the threshold capacity.

Method 600 includes, at block 640, in response to the indication, storing the associated information 257 in fill buffer 228. While the indication is asserted and trace buffer 125 does not have sufficient space for information 257, information 257 may be stored, instead, in fill buffer 228. Information 257 may be stored in fill buffer 228 until enough capacity has been freed from trace buffer 125.

In some embodiments, method 600 may end in block 640, or in other embodiments, may repeat some or all operations. For example, method 600 may return to block 620, after information for a subsequent memory request has been stored in trace buffer 125. Performance of various operations of methods 500 and 600 may be performed concurrently. For example, operation 610 of method 600 may be performed in conjunction with operation 510 of method 500.

Figure 7:
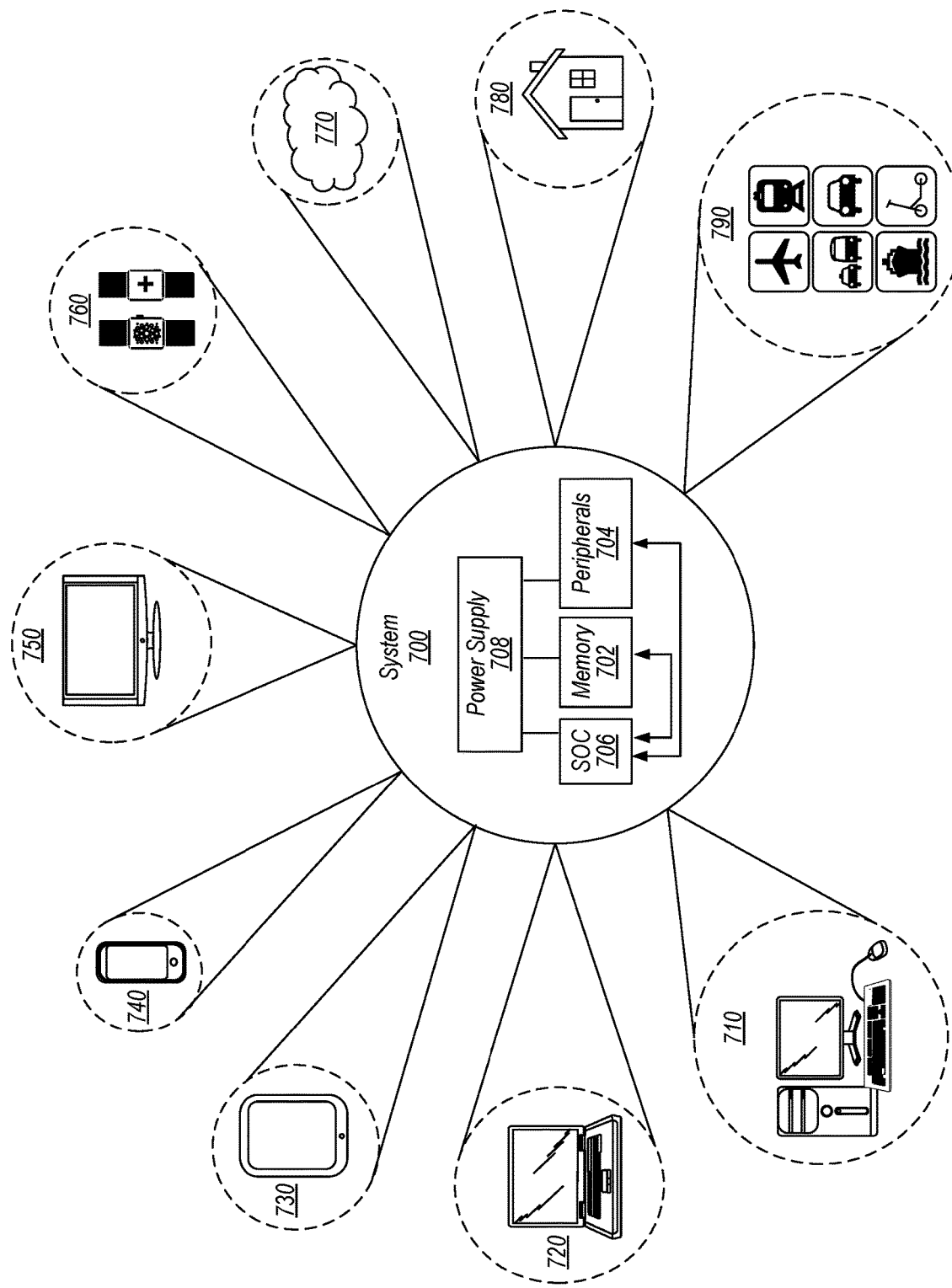
FIG. 7 illustrates various embodiments of systems that include coupled integrated circuits.

FIGS. 1-6 illustrate circuits and methods for a system that includes a trace control circuit for performing trace operations in a computer system. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 700 is illustrated in FIG. 7. Computer system 700 may, in some embodiments, include any disclosed embodiment of system 100, 200, and 300.

In the illustrated embodiment, the system 700 includes at least one instance of a system on chip (SoC) 706 which may include multiple types of processing circuits, such as a central processing unit (CPU), a graphics processing unit (GPU), or otherwise, a communication fabric, and interfaces to memories and input/output devices. In some embodiments, one or more processors in SoC 706 includes multiple execution lanes and an instruction issue queue. In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory 702 is included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 760 are contemplated as well, such as devices worn around the neck, devices attached to hats or other headgear, devices that are implantable in the human body, eyeglasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home 780 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise.

It is noted that the wide variety of potential applications for system 700 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 7 are illustrative only and are not intended to be limiting. Other devices are possible and are contemplated.

As disclosed in regards to FIG. 7, computer system 700 may include one or more integrated circuits included within a personal computer, smart phone, tablet computer, or other type of computing device. A process for designing and producing an integrated circuit using design information is presented below in FIG. 8.

Figure 8:
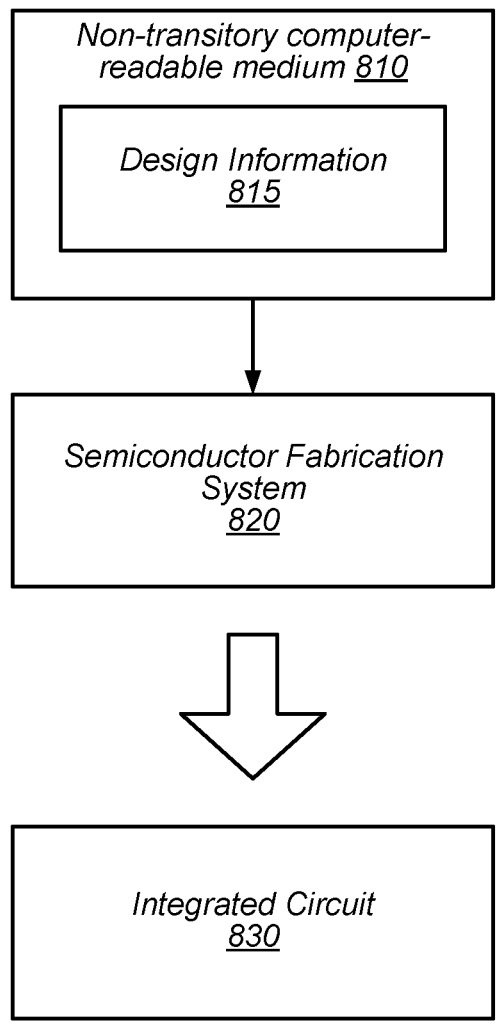
FIG. 8 shows a block diagram of an example computer-readable medium, according to some embodiments.

FIG. 8 is a block diagram illustrating an example of a non-transitory computer-readable storage medium that stores circuit design information, according to some embodiments. The embodiment of FIG. 8 may be utilized in a process to design and manufacture integrated circuits, for example, systems 100, 200, and/or 300 as shown in FIGS. 1-3. In the illustrated embodiment, semiconductor fabrication system 820 is configured to process the design information 815 stored on non-transitory computer-readable storage medium 810 and fabricate integrated circuit 830 (e.g., system 100, 200, and/or 300) based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system, such as semiconductor fabrication system 820, for example. In some embodiments, design information 815 may include a netlist that specifies elements of a cell library, as well as their connectivity. One or more cell libraries used during logic synthesis of circuits included in integrated circuit 830 may also be included in design information 815. Such cell libraries may include information indicative of device or transistor level netlists, mask design data, characterization data, and the like, of cells included in the cell library.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown or described herein. Further, integrated circuit 830 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   a plurality of processor circuits;
   a cache memory circuit; and
   a trace control circuit configured, in response to activation of a mode to record information indicative of program execution of at least one processor circuit of the plurality of processor circuits, to:
      monitor memory requests transmitted between ones of the plurality of processor circuits and the cache memory circuit;
      select a particular memory request of monitored memory requests using an arbitration algorithm;
      allocate space in a trace buffer to the particular memory request; and
      store, in the trace buffer, information associated with the particular memory request.

2. The apparatus of claim 1, wherein the particular memory request is a read request that results in a cache miss.

3. The apparatus of claim 2, wherein to store the associated information in the trace buffer, the trace control circuit is configured to copy cache fill data enroute to the cache memory circuit.

4. The apparatus of claim 1, wherein the trace control circuit is further configured to:
   store the particular memory request in an entry in a request buffer; and
   delete the entry in response to a determination that the information associated with the particular memory request has been stored in the trace buffer.

5. The apparatus of claim 1, wherein the trace control circuit is further configured to, in response to a determination that the trace buffer has reached a threshold level of capacity, issue a stall request to one or more of the processor circuits.

6. The apparatus of claim 1, further comprising a fill buffer, and wherein the trace control circuit is further configured to store the associated information in the fill buffer in response to a determination that the trace buffer does not have sufficient space for the associated information.

7. The apparatus of claim 1, wherein the trace control circuit is further configured to include a timestamp with the associated information.

8. A method, comprising:
   in response to an activation of a mode to record information indicative of program execution of one or more processor circuits, monitoring, by a trace control circuit, memory requests issued from the one or more processor circuits;
   determining, by the trace control circuit, that a subset of the issued memory requests will cause a cache memory circuit to fetch data from a different memory circuit;
   selecting, by the trace control circuit, a particular memory request of the subset of the issued memory requests using an arbitration algorithm;
   allocating, by the trace control circuit, locations in a trace buffer for the particular memory request; and
   storing, by the trace control circuit in the locations in the trace buffer, information associated with processing of the particular memory request.

9. The method of claim 8, further comprising selecting the particular memory request in response to determining that the particular memory request is a read request that results in a cache miss.

10. The method of claim 9, further comprising, prior to the storing, reading cache fill data associated with the particular memory request as the cache fill data is enroute to the cache memory circuit.

11. The method of claim 8, further comprising:
storing the subset of the issued memory requests in respective entries in a request buffer; and
deleting a respective entry in response to determining that information associated with a corresponding memory request has been stored in the trace buffer.

12. The method of claim 8, further comprising, in response to an indication that the trace buffer has reached a threshold capacity, stalling at least one of the one or more processor circuits.

13. The method of claim 12, further comprising, in response to the indication, storing the associated information in a fill buffer.

14. The method of claim 8, further comprising including a timestamp with the associated information.

15. A system, comprising:
a memory circuit;
a cache memory circuit configured to issue memory requests to the memory circuit in response to a cache miss;
a trace control circuit configured, in response to activation of a mode to record information associated with accesses to the memory circuit, to:
determine that the cache memory circuit issued one or more memory requests to the memory circuit;
select a particular memory request of the one or more memory requests using an arbitration algorithm;
allocate locations in a trace buffer for the particular memory request; and
store, in the locations in the trace buffer, information associated with processing of the particular memory request.

16. The system of claim 15, wherein to select the particular memory request, the trace control circuit is further configured to select the particular memory request in response to a determination that the particular memory request is a read request that results in the cache miss.

17. The system of claim 16, wherein the trace control circuit is further configured, prior to the storing, to read cache fill data associated with the particular memory request as the cache fill data is in transit to the cache memory circuit.

18. The system of claim 15, wherein the trace control circuit is further configured to:
store the one or more memory requests in respective entries in a request buffer; and
delete a respective entry in response to a determination that information associated with a corresponding memory request has been stored in the trace buffer.

19. The system of claim 15, wherein the trace control circuit is further configured, in response to a determination that the trace buffer does not have sufficient space to hold the associated information, to assert a stall signal, wherein the stall signal causes the cache memory circuit to cease issuing further memory requests.

20. The system of claim 19, wherein the trace control circuit is further configured to store the associated information in a fill buffer in response to the determination that the trace buffer does not have sufficient space.

\* \* \* \* \*